United States Patent [19]

Lederman

[11] Patent Number: 4,953,353
[45] Date of Patent: Sep. 4, 1990

[54] ROLLER CLUTCH FOR STATOR ASSEMBLY

[75] Inventor: Frederick E. Lederman, Sandusky, Ohio

[73] Assignee: General Motors Corporation, Detroit, Mich.

[21] Appl. No.: 397,211

[22] Filed: Aug. 23, 1989

[51] Int. Cl.[5] .............................................. F16D 33/00
[52] U.S. Cl. ........................................ 60/345; 192/45; 188/82.84
[58] Field of Search ................. 192/3.34, 45; 60/341, 60/345, 362; 188/82.84

[56] References Cited

U.S. PATENT DOCUMENTS

| | | | |
|---|---|---|---|
| 3,014,567 | 12/1961 | Stockton | 192/45 |
| 3,665,707 | 5/1972 | Koivunen | 60/345 |
| 3,886,740 | 6/1975 | Krok | 60/341 |
| 3,917,036 | 11/1975 | Johnson et al. | 192/45 |
| 3,954,161 | 5/1976 | Ehret et al. | 192/45 |
| 3,955,659 | 5/1976 | Ehret et al. | 192/45 |
| 4,009,570 | 3/1977 | Ohkuoo et al. | 60/341 |
| 4,117,677 | 10/1978 | Murakami et al. | 60/345 |
| 4,377,068 | 3/1983 | Braatz | 60/341 |
| 4,441,315 | 4/1984 | Bochot | 60/345 |
| 4,660,698 | 4/1987 | Miura | 192/45 |
| 4,821,857 | 4/1989 | Grob | 192/45 |

*Primary Examiner*—Richard Lorence
*Attorney, Agent, or Firm*—Patrick M. Griffin

[57] ABSTRACT

A roller clutch subassembly for incorporation into the hub of a torque converter stator has an integrally molded plastic cage unit that holds the springs and rollers, and in which an array of windows opening through the cage unit allow roller pockets of the cage unit to be bypass molded, as well as allowing visual access to the pockets post installation.

2 Claims, 6 Drawing Sheets

ROLLER CLUTCH FOR STATOR ASSEMBLY

This invention relates to overrunning roller clutches stator assembly, and specifically to a roller clutch assembly in which several components are integrated into an easily manufactured and installed unit.

BACKGROUND OF THE INVENTION

Modern vehicle automatic transmission torque converters incorporate a stator assembly between the engine driven pump and the transmission driving turbine to multiply torque. A set of oil redirecting vanes is fixed to a central stator hub. The outer race of an overrunning roller clutch is mounted in the stator hub, while the inner race is splined to a stationary stator shaft. The roller clutch provides a one-way brake so that the stator can act as a reaction member to redirect oil leaving the turbine blades back to the pump blades, until the turbine is moving at pump speed. The typical roller clutch assembly incorporated into the stator hub has a multitude of separate components, each of which must be separately handled and installed. In addition, the retention structures used to hold the various components into the hub create a visual obstruction that makes it more difficult to confirm that all components are in place.

SUMMARY OF THE INVENTION

The invention provides a roller clutch cage unit for installation into the same stator hub that integrates many of the otherwise separate components, giving a stator assembly that is simpler to manufacture, install and inspect.

In the preferred embodiment disclosed, an outer cam race is adapted to be mounted in the hub of the stator, and an inner pathway race is disposable coaxial to the cam race with a nominal, predetermined radial space therebetween. A cage unit is integrally molded of a suitable plastic, and has a front retention plate with an inner race engaging shoulder at its inner diameter and a series of stator hub engaging, radially flexible fingers at its outer diameter. An end ring, which has a radial width less than the diameter of a roller, is axially spaced from the retention plate by approximately the length of a roller. The end ring also has a radius that locates it approximately midway between the clutch races. The front plate also has a circular array of windows molded axially through it at the same radius as the end ring. At the interstices between windows, a plurality of axially extending journal blocks, each of which has a thickness equal to the radial space between the races, joins the front retention plate to the end ring. The windows allow access for mold elements so that the cage unit may be bypass molded. The front plate, end ring, and journal blocks together create an evenly spaced series of rectangular pockets. A roller and spring is placed in each pocket of the cage to create an easily handled subassembly.

The completed roller clutch subassembly is installed by inserting the cage journal blocks into the radial space between the races until the retention plate hits the races and the fingers snap into a groove in the stator hub. The journal blocks provide bearings to keep the races coaxial, while the retention plate holds the races and the clutch subassembly in the stator hub with all components properly located and aligned. The windows through the retention plate, besides allowing the cage unit to be bypass molded, allow for direct visual confirmation of the fact that a roller and spring are in each pocket. In addition, the windows provide a direct path for lubricant flow axially through the clutch as the torque converter operates. Furthermore, in the embodiment disclosed, the outer surface of the retention plate provides a plain thrust bearing.

It is, therefore, an object of the invention to provide a roller clutch subassembly for installation with a pair of clutch races into the hub of a stator which integrates the roller retention, race spacing, and race retention features into a single, easily manufactured cage unit, and which also allows for direct visual confirmation of completion.

It is another object of the invention to provide such a cage unit that has a front retention plate relieved by an evenly spaced series of strategically placed windows, which allows a series of journal blocks and an end ring to be easily integrally molded to the retention plate, thereby creating a series of roller pockets that are open both to visual inspection and efficient lubricant flow.

It is another object of the invention to provide such a cage unit with an outer surface that also serves as a plain thrust bearing.

DESCRIPTION OF THE PREFERRED EMBODIMENT

These and other objects and features of the invention will appear from the following written description, and from the drawings, in which.

Figure 1:
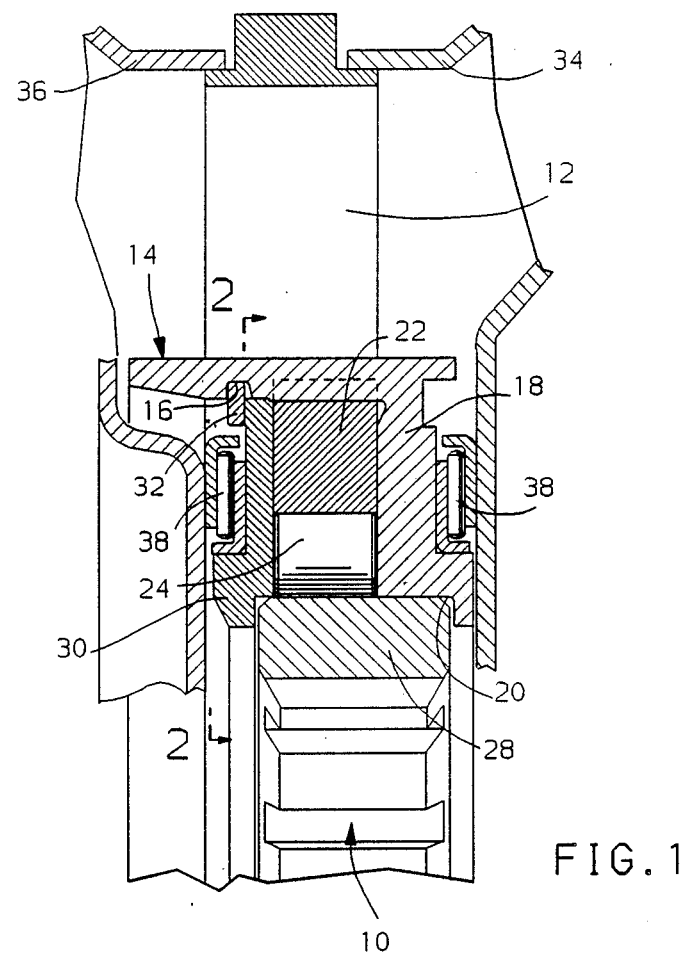
FIG. 1 is a cross sectional view of a prior art stator and roller clutch assembly, with part of the pump and turbine housing of a typical torque converter illustrated as well.
Figure 4:
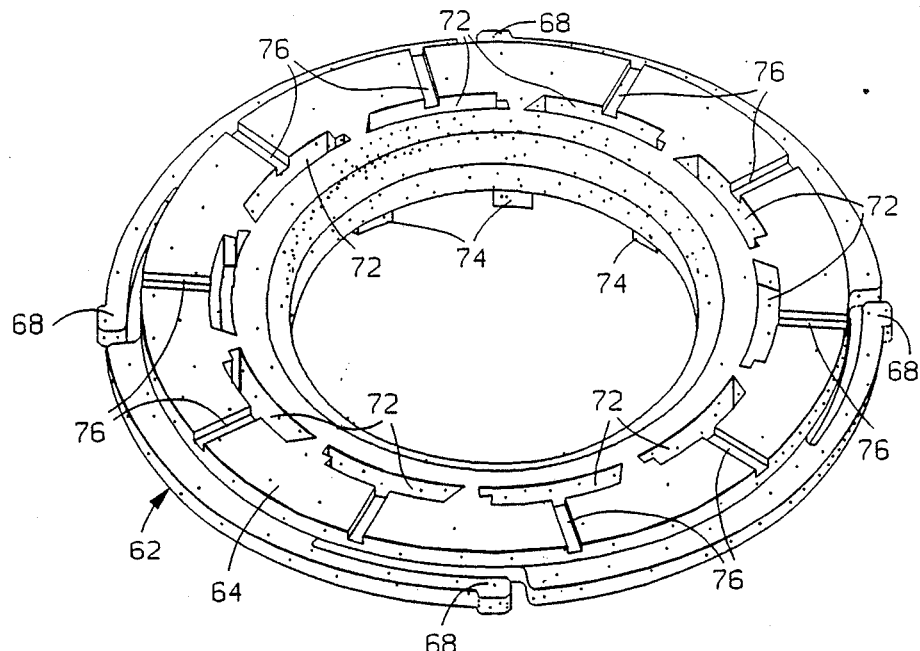
Figure 5:
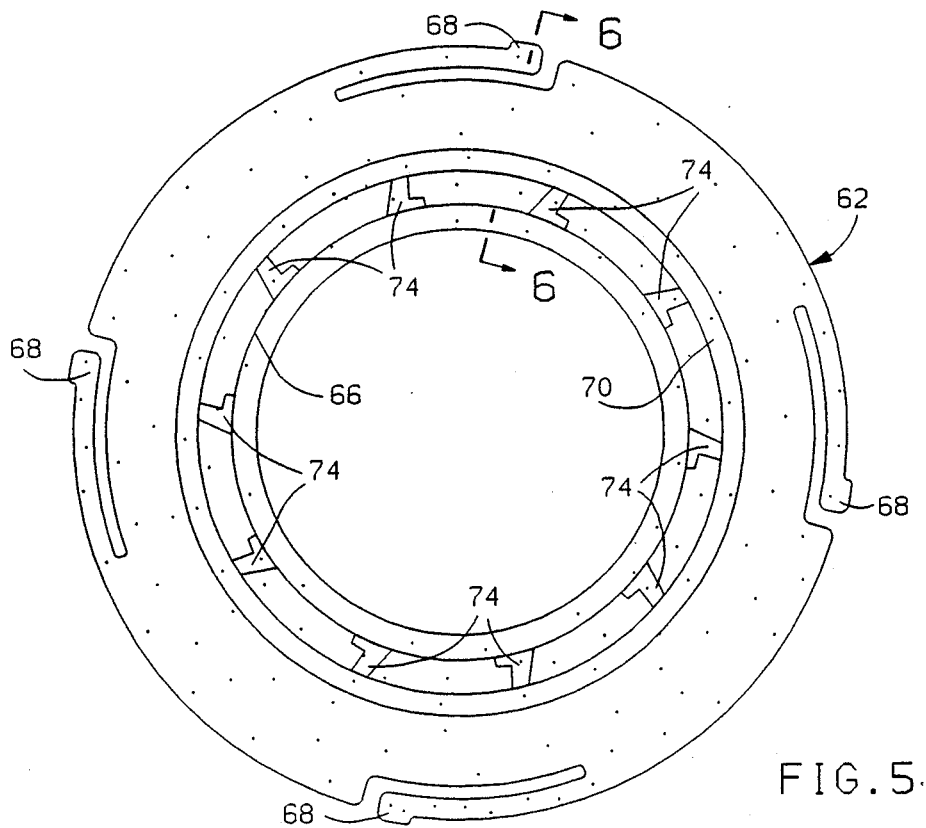
Figure 6:
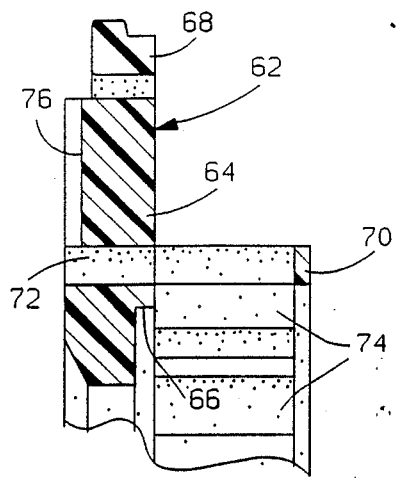
Figure 8:
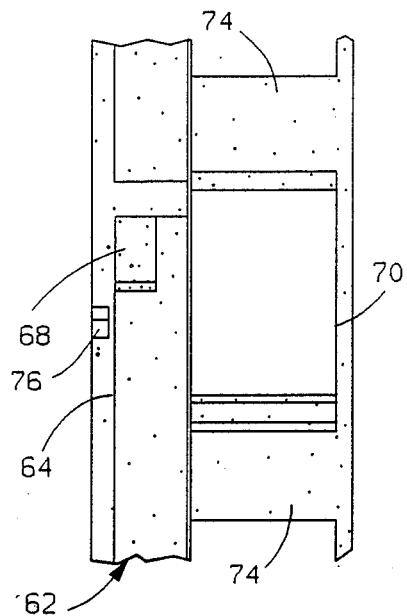
Figure 7:
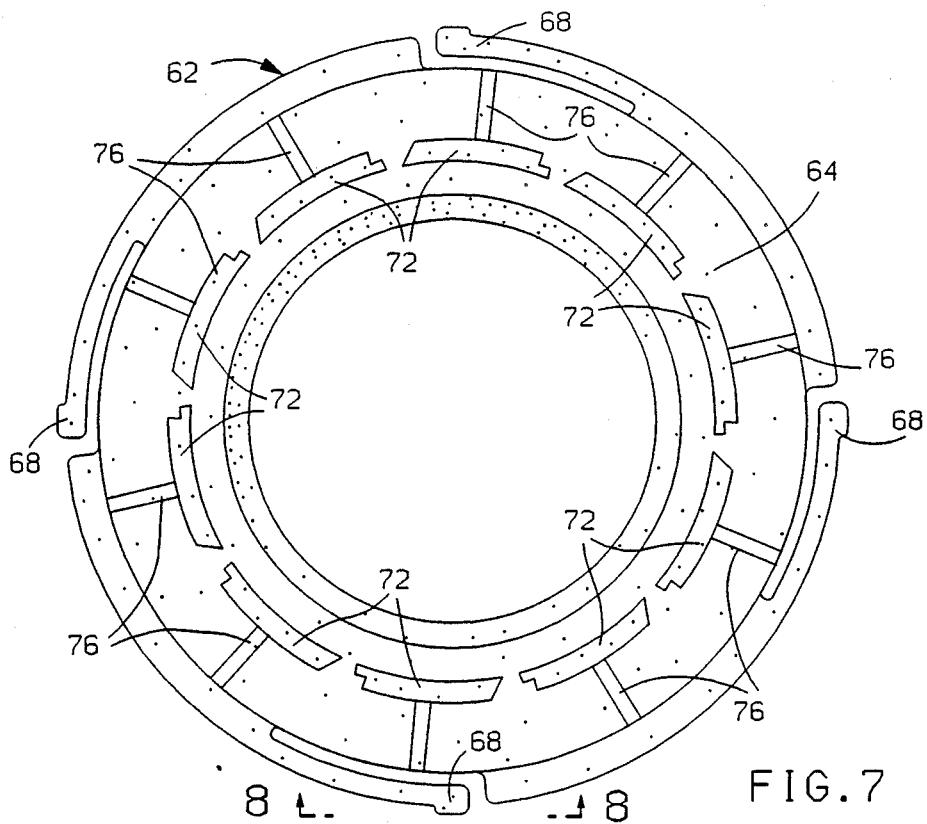
Figure 9:
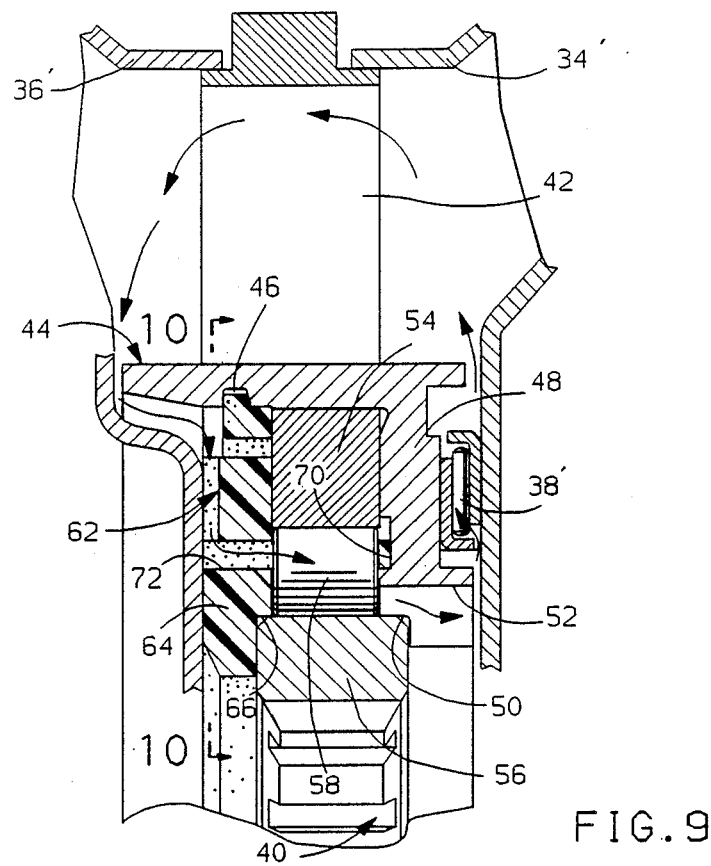
Figure 10:
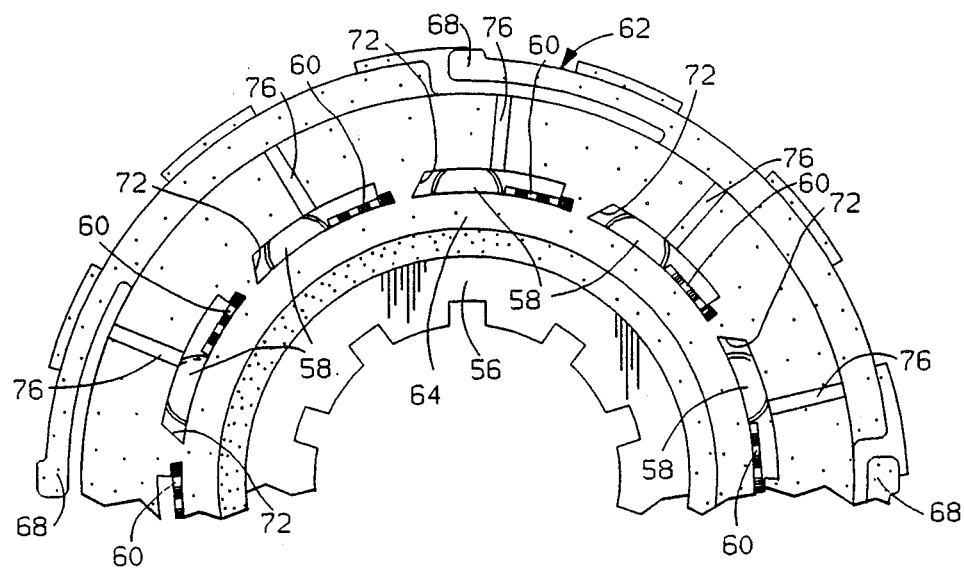
Figure 11:
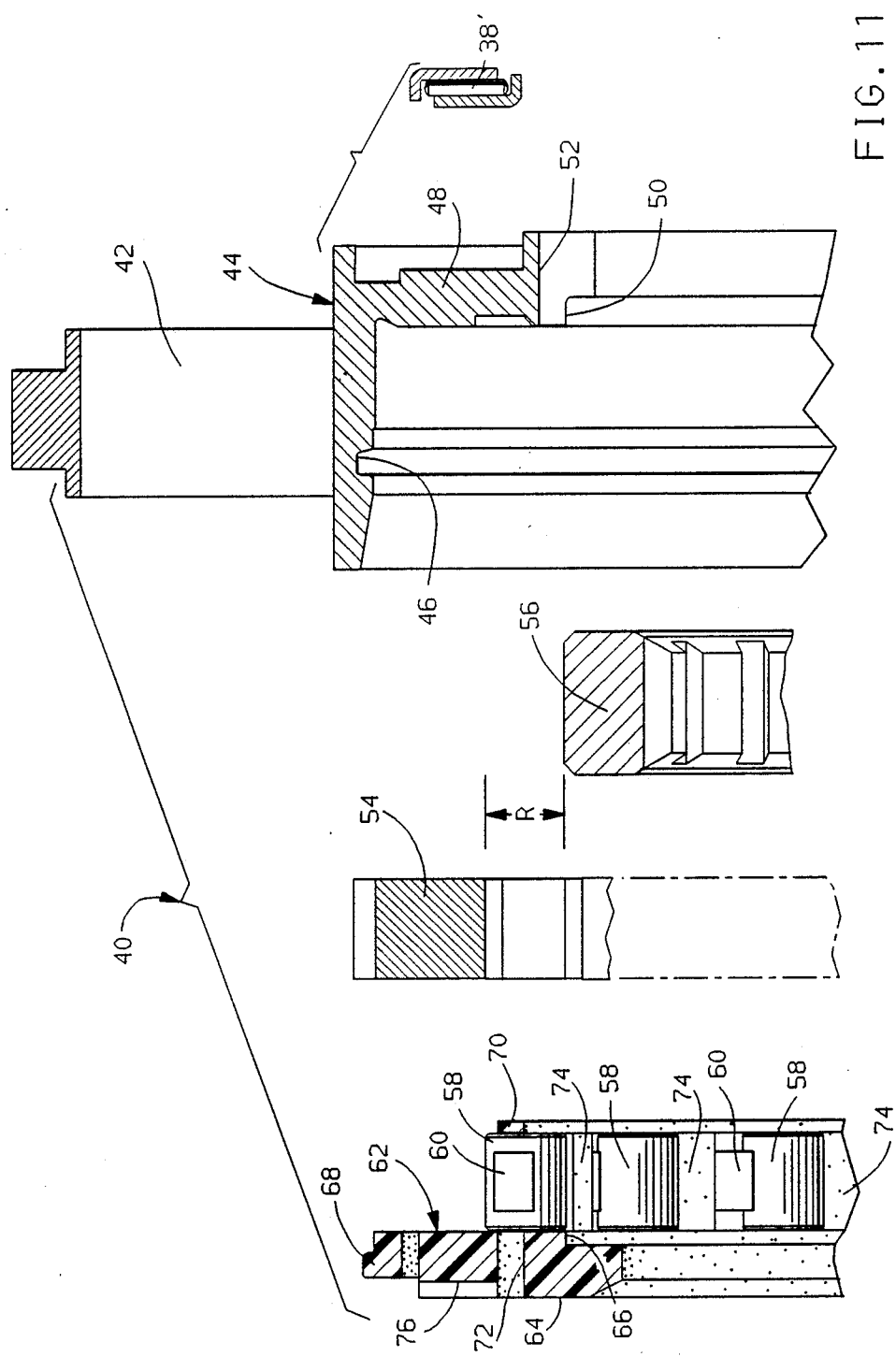

FIG. 4 a perspective view of the front of the cage unit of the invention;

FIG. 5 is an end view of the back of the cage unit;

FIG. 6 is a sectional view of the cage unit taken along the line 6—6 of FIG. 5;

FIG. 7 is an end view of the front of the cage unit;

FIG. 8 is a view looking radially into a pocket from the perspective of line 8—8 of FIG. 7;

FIG. 9 is a cross sectional view of the stator assembly of the invention, incorporated in the same torque converter as in FIG. 1;

FIG. 10 is a sectional view taken along the line 10—10 of FIG. 9;

FIG. 11 is an axially exploded view of the components of FIG. 9.

Figure 2:
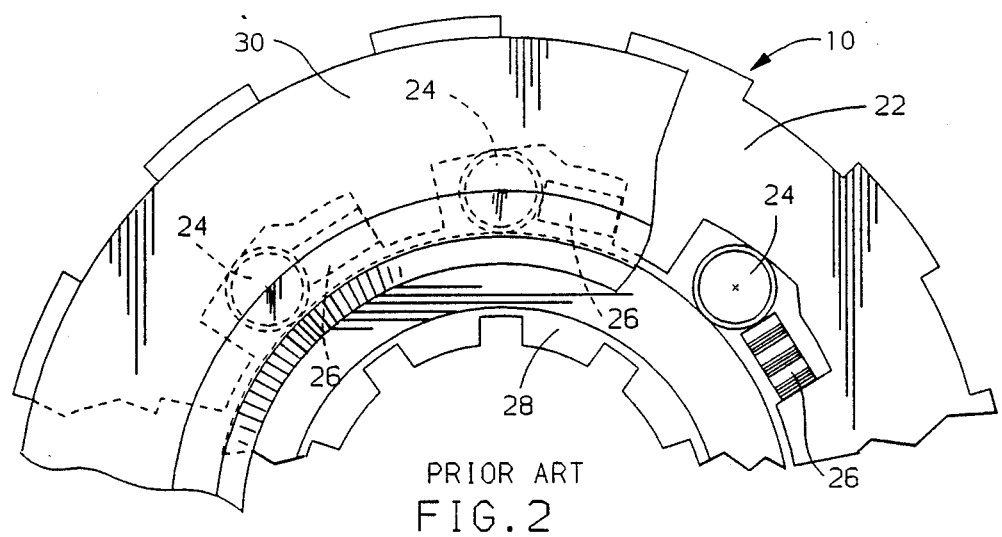
FIG. 2 is a sectional view taken along the line 2—2 of FIG. 1, and showing a retainer plate partially broken away to reveal structure behind.

Referring first to FIGS. 1 and 2, a prior art stator assembly, indicated generally at 10, includes a large number of components. Cast aluminum stator vanes 12 radiate from a cylindrical central hub, indicated generally at 14. Hub 14 has an interior snap ring groove 16, and is partially closed by an end wall 18 with an inner shoulder 20. An outer cam race 22 is splined so as fit nonturnably within stator hub 14, abutted with hub end wall 18. Cam race 22 is part of a conventional leg type roller clutch, which retains an evenly spaced series of rollers 24 and springs 26 without a separate cage. The rollers 24 roll on an inner pathway race 28, which would be splined nonturnably to a central, stationary stator shaft, not illustrated. All other components would be coaxially arrayed about the central stator shaft, as well. The races 22 and 28 are retained inside hub 14 by a retainer plate 30, which, in turn, is retained by a snap ring 32 in groove 16, as shown in FIG. 1. Retainer plate 30 maintains the cam race 22 abutted with hub end wall 18 as well as maintaining the pathway race 28 abutted with hub end wall shoulder 20. Assembly 10 is handled as one unit, and is installed by sliding inner pathway race 28 over the stator shaft, between a conventional torque converter pump 34 and turbine 36. Conventional thrust bearings 38 are placed between hub end wall 18 and pump 34, as well as between the front of retainer plate 30 and turbine 36.

Figure 3:
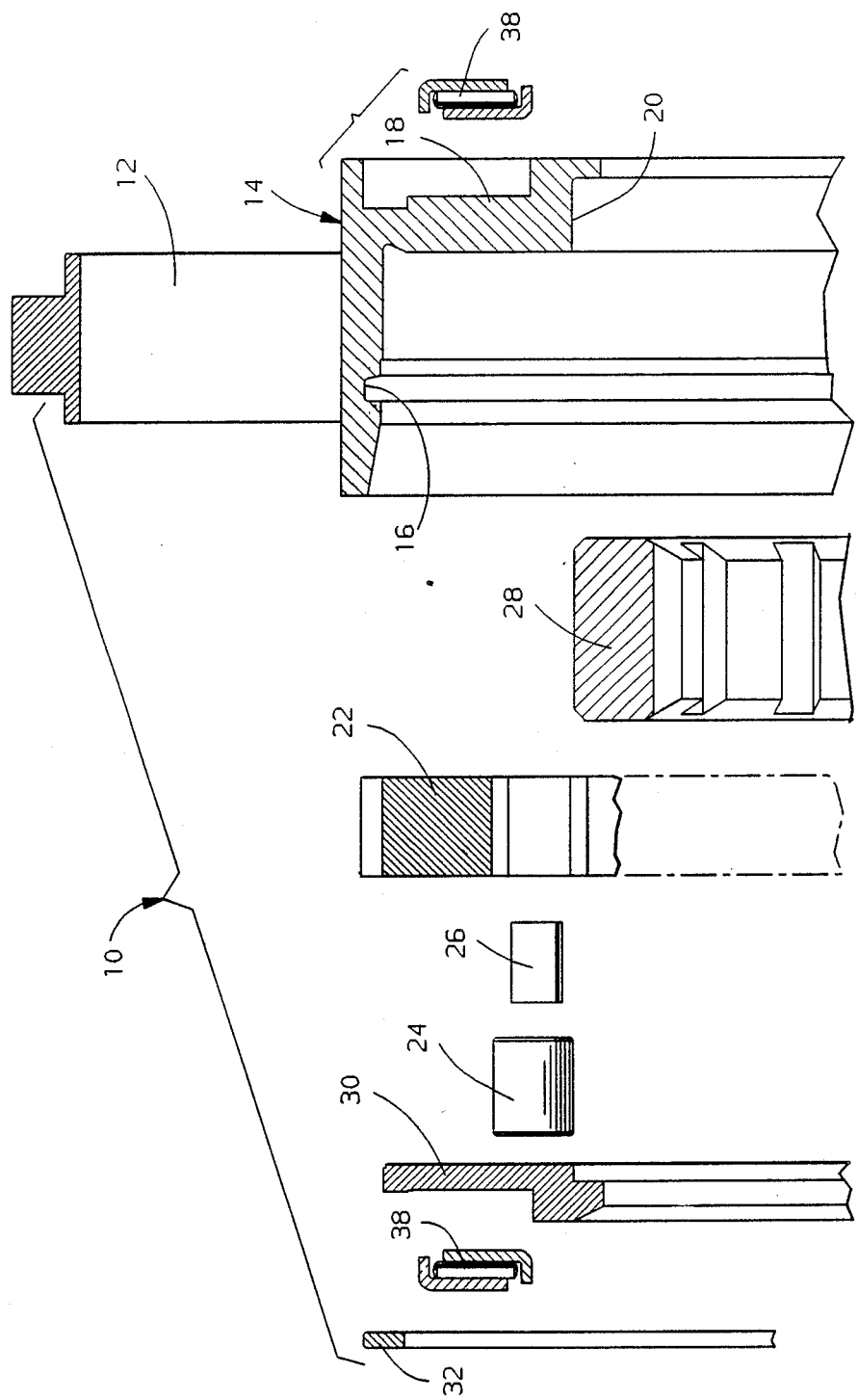
FIG. 3 is an axially exploded view of the components of FIG. 1.

Referring next to FIGS. 2 and 3, it may be seen that, excluding the thrust bearings 38, and counting the rollers 24 and springs 26 as two components only, there are seven separate components that have to be handled by the builder of stator assembly 10. The lack of a cage between the races 22 and 28 means that each roller 24 and spring 26, of which there are perhaps eight to ten, has to be separately handled and installed. Adding to the assembly difficulty, as seen in FIG. 2, is the fact that retainer plate 30 must be wide enough to cover one edge of pathway race 28, if it is to maintain its axial overlap with hub shoulder 20. This axial overlap between pathway race 28 and hub shoulder 20 is necessary to keep the races 22 and 28 coaxial, as they do not pilot directly on one another. Retainer plate 30, therefore, blocks visual access to the rollers 24 and springs 26, and assurance of assembly completeness is difficult. Furthermore, the retainer plate 30 and hub end wall 18 almost completely enclose the races 22 and 28, partially blocking the most efficient, direct axial flow of lubricant to the rollers 24.

Referring next to FIGS. 9 and 11, several of the components of the stator assembly of the invention, a preferred embodiment of which is indicated generally at 40, are very similar to stator assembly 10. Stator assembly 40 is installed in the same torque converter, between the same pump and turbine, which are given the same numbers with a prime. Stator vanes 42 identical to vanes 12 radiate from a cylindrical central hub, indicated generally at 44. Hub 44 is the same size and basic shape, but with some differences. Hub 44 has an interior snap ring groove 46 in the same location as groove 16, and is also partially closed by an end wall 48. However, the shoulder 50 at the inner edge of end wall 48 is less deep than shoulder 20, and is relieved at two or three evenly spaced locations by a port 52, for a reason described below. An outer cam race 54, which is the same basic size as cam race 22, is splined so as to fit nonturnably within stator hub 44, abutted with hub end wall 48. An inner pathway race 56 has a similar predetermined radial spacing from cam race 54 as pathway race 28, indicated at R in FIG. 11. Inner race 56 is also splined to fit to the same stationary stator shaft, but is axially narrower than race 28. Conventional rollers 58 and springs 60 provide for selective relative rotation between the races 54 and 56, but are much more conveniently handled, as will appear below.

Referring next to FIGS. 4 through 8, the main structural framework of the invention is a one-piece cage unit, indicated generally at 62. Cage unit 62 has a front retention plate 64, which has a similar radial width, but greater axial thickness, than plate 30. Retention plate 64 includes a shoulder 66 at its inner edge and a series of four radially flexible fingers 68 at its outer edge. A thin annular end ring 70, which has a radial width about a third of the diameter of a roller 58, is disposed parallel to plate 64, spaced therefrom by just slightly more than the length of a roller 58, as best seen in FIG. 8. The radius of end ring 70 is such as to place it near the center of the radial space R. As best seen in FIG. 7, an evenly spaced circular array of windows 72 is molded axially through retention plate 64, equal in number to the rollers 58. The windows 72 are at the same radius as, and exactly the same width as, the end ring 70, and so open into the radial space R. Extending axially in from the backside of retention plate 64 to end ring 70 is an equal plurality of journal blocks 74, one at the interstice between each window 72. Each journal block 74 is generally L shaped in cross section, and has a thickness approximately equal to R. The journal blocks 74 create a plurality of rectangular pockets, along with end ring 70 and retention plate 64, one of which is clearly illustrated in FIG. 8.

Referring next to FIGS. 5, 6 and 7, more detail as to the design and purpose of cage unit 62 is illustrated. While the shape of cage unit 62 is complex, it is specifically designed so as to be easily integrally molded. As can be clearly seen by comparing FIGS. 5 and 7, the end ring 70, windows 72, and journal blocks 74 have no mutual radial overlap, and their surfaces have no undercuts relative to the central axis of cage unit 62. The same is true for all surfaces of the cage unit 62. Those skilled in the art will recognize that this allows a series of mold elements on one mold half to pass through the windows 72, mold the inner surface of the end ring 70 and the inner surfaces of the journal blocks 74, and then be withdrawn along a straight line. This technique is known as bypass molding, and is the most efficient way to mold an integral part, needing only two mold halves. Finally, on the outer surface of retention plate 64, a series of radial grooves 76 open from the outer diameter into the approximate center of each window 72. The grooves 76 and windows 72 cooperate to provide features in addition to efficient one-piece molding, as will be described next.

Referring next to FIGS. 9 through 11, a roller 58 and spring 60 can be added to each pocket of cage unit 62 to create a unit handled subassembly. The completed roller clutch subassembly is installed by inserting the cage journal blocks 74 between the races 54 and 56 until retention plate shoulder 66 engages the face of pathway race 56, simultaneously with fingers 68 snapping out into stator hub groove 46. The cam race 54 is held in abutment with hub end wall 48, and the pathway race 56 is maintained in axial overlap with hub end wall shoulder 50. All components are retained together in coaxial relation. Thus, only the four components of stator hub 44, clutch races 54 and 56, and the roller clutch subassembly need be handled to complete stator assembly 40. These are best illustrated in FIG. 11. When stator assembly 40 is installed, only one thrust bearing, number 38', need be added, since retention plate 64 is thick enough that its outer surface can act as a plain bearing against turbine 36'. While the assembler and installer of stator assembly 40 would not likely be the one to add the rollers 58 and springs 60, he may easily confirm their presence visually through the windows 72, as seen in FIG. 10. This is not possible with the prior stator assembly 10. Furthermore, the windows 72, in cooperation with the grooves 76, provide for a more direct and efficient lubricant flow path through the races 54 and 56. The path of oil within the torque converter, as it leaves the turbine 36' and is redirected by the stator vanes 42 to the pump 34', is a continuous spiral around the surface of a torus, as illustrated in FIG. 9. Some of that oil can be diverted down the grooves 76, through the windows 72, between the races 54 and 56, out the hub ports 52, and back around. In stator assembly 10, this direct path is blocked by the retention plate 30. The directing of oil into the grooves 76 also helps to lubricate the outer surface of retention plate 64, assisting it in its function as a plain bearing in abutment with the turbine. Since the journal blocks 74 serve to maintain the radial space R, pathway race 56 can be narrower than pathway race 28, since it does not need as much axial overlap with hub end wall shoulder 50 in order to keep the parts coaxial. Thus, there is a high degree of cooperation among the various structural features of the invention, which improves manufacture, assembly, installation and operation.

Variations of the preferred embodiment may be made. The grooves 76 and hub ports 52 could be eliminated if the increased lubricant flow through the races 54 and 56 were not desired. The windows 72 alone give both ease of manufacture and direct visual confirmation of assembly completion. Likewise, retention plate 64 need not be made as thick as it is, but could instead be notched, outboard of the windows 72, to receive a conventional needle thrust bearing like 38. Therefore, it will be understood that it is not intended to limit the invention to just the embodiment disclosed.

The embodiments of the invention in which an exclusive property or privilege is claimed are defined as follows:

Claims:

1. A torque converter stator assembly, comprising,
   a stator having a central cylindrical hub with an end wall and a retention groove,
   a pair of clutch races disposed coaxially within said hub with a predetermined radial spacing therebetween,
   an integrally molded cage unit including a front race retention wall,
   said cage unit retention wall having a flexible retention means engageable with said retention groove to prevent said races from moving away from said end wall within said hub,
   said cage unit retention wall further having an evenly spaced plurality of windows arrayed in a circle and opening axially therethrough into said radial space, said windows having a radial width less than said predetermined radial spacing,
   said cage unit further including a plurality of journal blocks extending axially inwardly from said retention wall between said windows, said journal blocks having a redial thickness approximately equal to said predetermined radial spacing,
   said cage unit further including a circular end ring disposed parallel to and axially spaced from said retention wall and integral with said journal blocks so as to form a plurality of pockets, said end ring further occupying only radial space unoccupied by said windows, so that said cage unit may be bypass molded, and,
   a roller and energizing spring located in each of said pockets,
   whereby, said cage unit, rollers and springs may be installed as a subassembly between said races, after which said windows provide direct visual access to said rollers and springs.

2. In a torque converter stator assembly having a central cylindrical hub with an end wall and a retention groove, and also having a pair of clutch races disposed coaxially within said hub with a predetermined radial space therebetween, and a plurality of rollers and energizing springs disposable within said radial space, the improvement comprising,
   an integrally molded roller clutch cage unit including a front race retention wall,
   said cage unit retention wall having a flexible retention means engageable with said hub retention groove to prevent said races from moving away from said end wall in said hub,
   said cage unit retention wall further having an evenly spaced plurality of windows arrayed in a circle and opening axially therethrough into said radial space said windows having a radial width less than the diameter of said rollers,
   said cage unit further including a plurality of journal blocks extending axially inwardly from said retention wall between said windows, said journal blocks having a radial thickness approximately equal to said predetermined radial spacing,
   said cage unit further including a circular end ring disposed parallel to and axially spaced from said retention wall and integral with said journal blocks so as to form a plurality of pockets for said rollers and springs, said end ring further occupying only radial space unoccupied by said windows, so that said cage unit may be bypass molded,
   whereby, said cage unit, rollers and springs may be installed as a subassembly between said races, after which said windows provide direct visual access to said rollers and springs.

* * * * *